Dec. 6, 1949     R. S. FUNK     2,490,043
VALVE
Filed Aug. 20, 1945
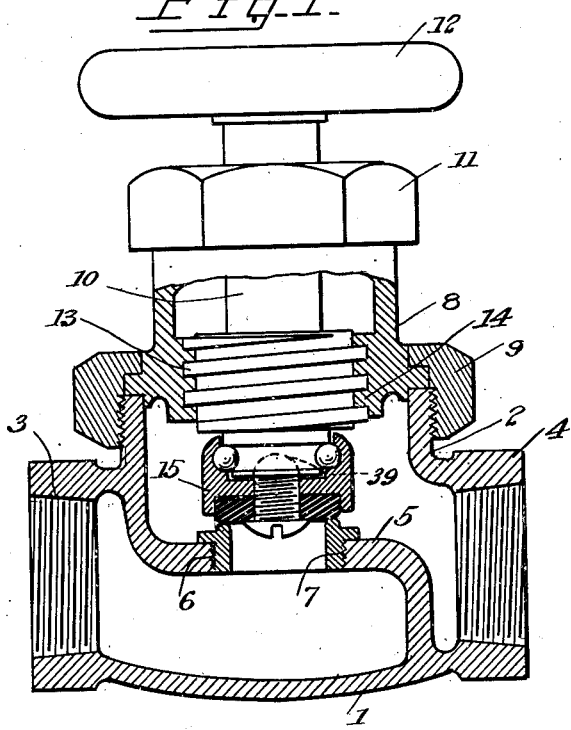
Fig. 1.
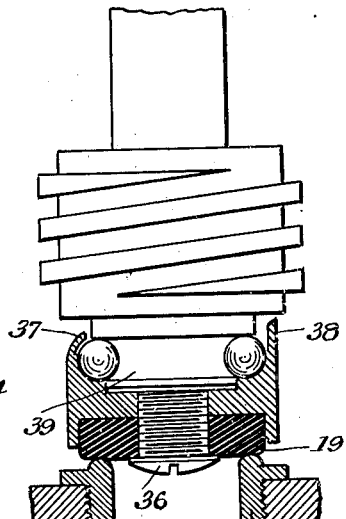
Fig. 2.
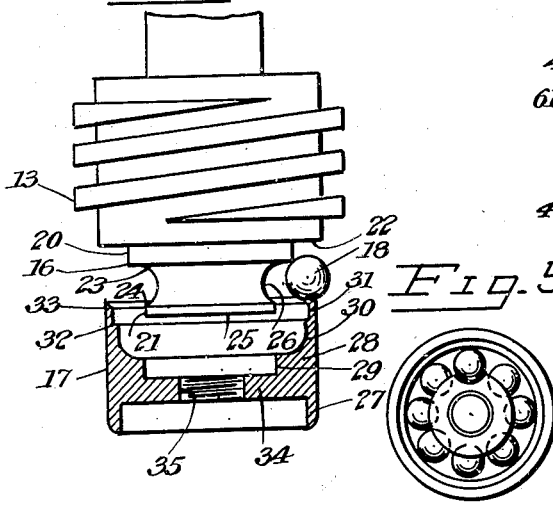
Fig. 3.
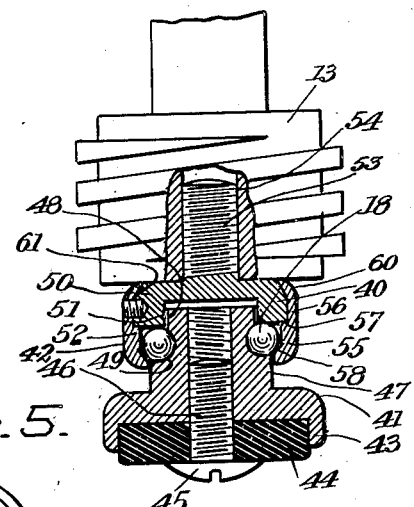
Fig. 4.
Fig. 5.
INVENTOR:
Robert S. Funk;
BY
Attorney.

Patented Dec. 6, 1949

2,490,043

UNITED STATES PATENT OFFICE 2,490,043

VALVE

Robert S. Funk, Los Angeles, Calif.

Application August 20, 1945, Serial No. 611,581

4 Claims. (Cl. 251—46)

The present invention relates to valves and contemplates a valve adapted to allow a ready closing thereof without the valve rotating upon the valve seat.

Another object is the provision of a frictionless type of valve having its parts so arranged and interrelated as to be of small vertical dimension. The inventor is aware that there are on the market so-called ball valves which utilize ball bearings. Such devices however are of large size and difficult to use in existing equipment such as in globe valves universally supplied to the plumbing trade. The present valve in one embodiment may constitute a replacement for valves generally employed in any standard fitting.

Abrasive wear causes a rapid deterioration of washers, particularly when the stem which connects the valve fitting rotates the fitting and the said washer in its engagement with the valve seat. It is well known that the average user of valves attempts to close them too tightly to their seats. With the present invention when the washer contacts the seat the rotation of the washer on the seat is stopped, although the valve stem may be rotated.

An object of the invention is a valve construction which is adapted to relieve excessive pressure of the valve against its seat when too tight a closure has been made, while at the same time not permitting a leak through the valve.

Another object is a valve construction which effects a long washer life and reduces maintenance charges and repairs.

Another object is the provision of a valve structure which is inexpensive in cost of manufacture and generally superior to ordinary valves.

In the drawings:

Fig. 1 is a fragmentary vertical sectional view of a globe valve incorporating one form of the valve;

Fig. 2 is a fragmentary vertical section on an enlarged scale of the valve and certain associated elements illustrated in Fig. 1;

Fig. 3 is a fragmentary vertical sectional view showing certain elements of the valve in detached relationship;

Fig. 4 is a vertical sectional view of a modified form of the valve; and,

Fig. 5 is a top plan view of one of the elements of the valve shown in Fig. 4.

Referring now to the drawings:

I have illustrated in Fig. 1 one type of body commonly known as "globe," and designated as 1. This globe type body includes a housing 2, having a threaded inlet 3 and threaded outlet 4, with a division wall 5 within the said housing and separating the inlet from the outlet. The said wall is formed with a transverse threaded bore 6, adapted to receive a valve seat 7. The usual bonnet 8 is held to the housing by a threaded union 9. The said bonnet is adapted to confine a stem 10 passed through a cap nut 11 on said bonnet, the stem carrying a handpiece 12. The said stem is provided with a threaded nut 13 in threaded engagement with the bonnet at 14. Thus as the handle 12 is rotated the stem 10 is raised or lowered. One form of the valve of the present invention is shown in Fig. 1 at 15 and detailed as to construction in Figs. 2 and 3. Referring to Fig. 3, one member 16 of the valve is either integrally formed on the end of nut 13 or secured thereto in any appropriate manner. The said member 16 lies in the axis of the stem and nut 10 and 13 respectively. The second member 17 of said valve is adapted to be interconnected to member 16 through the medium of balls 18, and member 17 carries a washer 19 adapted for closure over or separation from the valve seat 7.

Member 16 is spool-like in form and is provided with upper and lower bases 20 and 21 of different external diameter. Base member 20, of greater diameter, is directly secured to the bottom surface 22 of nut 13. Furthermore, there is a difference in the thickness of each base member, as shown by lines 23 and 24, it being observed that base member 20 has the greater thickness. Portion 25 of member 16, included between the said bases, is formed with an annular concavity 26 of semicircular form.

The member 17 is provided with a circular recess 27, adapted to confine the washer 19, and an annular wall 28, so formed as to provide a circular recess at 29 of slightly greater diameter than the diameter of base member 21. This circular recess merges with an annular concavity 30 defining a race for the balls 18, and said annular concavity in turn joins with an annular wall 31, the internal diameter of which is greater than the diameter of the annular concavity 30, to thereby provide an annular ledge or shoulder 32. The annular wall 31 terminates in an inclined edge portion 33. This structure as formed provides a bridging wall 34 between circular recesses 27 and 29, which wall is provided with a central screwthreaded bore 35. In this manner the washer 19 may be held in the recess 27 by a nut 36 passed through said washer for engagement with the threads 35. When it is desired to assemble the valve structure shown in Figs. 1–3 inclusive, the stem 10 is raised so as to position the valve member 16 in the position shown in Fig. 3, which allows the balls 18 to pass between the edge 23 of base member 20 and the inclined edge 33 of member 17. Thus the balls will be positioned in the annular concavity 26, it being assumed that the required number of balls have been poured therebetween. The stem 10 is then lowered, which will move the balls within race 30 and the balls will finally be positioned between the two concavities 26 and 30 which define the races, and in the manner illustrated in Fig. 2. The shoulder or ledge 32 constitutes a zone of weakness for the annular wall 31, which annular wall is rolled so as to position the same over the balls in the manner illustrated in Fig. 2, at 37. The appearance of wall 31 prior to rolling is indicated at 38, in Fig. 2. It is to be particularly observed that when the rolling operation has been completed, the base member 20 overlaps a vertical plane passed through the center of the balls, while base member 21 underlaps the center of the balls, as does likewise the inner edge of the concavity 30 where it merges with the circular recess 29. Hence there is an underlap and an overlap of the balls relative to their respective race members. Such a structure produces an effective result for the reason that when torque is imposed upon the stem 10 to seat the washer 19 upon the valve seat 7, downward compression is transmitted between the ball races through the medium of the balls. There is a solid surface engaging the balls at all times due to the underlap and overlap, which would not be true if the laps were of equal diameter and in alignment.

Actual tests have shown that such a construction is capable of producing superior results over a long period of time, without damage to the balls.

In Fig. 1 at 39 I have indicated a kerf which may be utilized in the event that member 16 has detachable engagement with nut 13. The member 16 may carry a threaded stem for insertion within an axially threaded bore in the said nut 13. This is accomplished by inserting a screwdriver through the opening 35 for reception in said kerf and prior to placing the washer 19 in position of service.

That form of the invention shown in Figs. 4 and 5 incorporates the features of that form of the valve shown in Figs. 1–3, although it is primarily intended that the valve in Figs. 4 and 5 shall be used as a replacement unit. The valve includes a top 40, a base or bottom member 41, and a cup or collar 42. The bottom 41 is circularly recessed at 43 to receive a washer 44, held therein by screw 45, which has engagement with a central threaded bore 46 in member 41. Member 41 is externally reduced in diameter at 47 and 48, with an annular concavity 49 between the aforesaid portions of reduced diameter. The top 40 includes a head 50, the bottom surface of which is provided with a central circular recess 51, and an annular plane surface portion 52. The top surface of said head is centrally provided with a threaded stem 53, which is adapted to be received within a central threaded bore 54 of the nut 13.

The cup or collar 42 constitutes an annulus of varying cross section, the portion 55 being of greater cross sectional width than portion 56, the construction defining an annular shoulder at 57. The portion 55 is inturned to provide a slight internal concavity 58 functioning to confine the balls within the race 49.

To assemble this form of the valve, member 40 is separated from the cup or collar, whereupon the balls 18 are dropped within the collar to position the same within the race 49. As the balls have a greater diameter than the space included between portion 48 and the internal diameter of the collar, portion 48 is provided with a vertical way or groove, as shown in Fig. 5, at 59. In this manner the balls may be separately positioned between the cup and the base, and the base and the cup will remain in working relationship. Thereafter, the top is positioned so that the plane surface 52 is brought into contact with the ledge or shoulder 57 of the cup or collar, with the surface 52 adjacent to and in light contact with the balls 18. The top edge 60 of the portion 56 of the cup or collar is then rolled or pressed inwardly against the annularly beveled portion 61 of said head, which effectively holds the head to the said cup or collar.

The operation, uses and advantages of the valve structures described are no doubt apparent. Either form of the valve is easily assembled and may be an integral part of the nut 13 or separable therefrom, whereby the valve may be obtained as a replacement unit. However, the only parts that would ever require replacement in normal use and service are the washers 19 and 44. Ease of assembly is a factor and may be accomplished by machine rather than by hand. It is quite apparent that the balls 18 will hold the cup or collar in juxtaposition to the bottom member prior to the placement of the top 40 in position, whereby the edge 60 may be pressed or rolled. As has heretofore been pointed out, downward compression is directly communicated to the balls and by the balls in turn to the bottom member 41 in one instance and the member 28 in a second instance. This as the result of underlapping and overlapping two members between which balls are placed, and whereby one of said members may rotate while the other member is stationary.

I claim:

1. The combination with a valve stem carried by a valve body and a valve seat within said body, of a valve carried by said stem and adapted to be raised from or lowered against said seat upon movement of said stem, said valve comprising two members one formed with a circular recess within which is positioned the other member, one of said members provided with two spaced portions of different diameters and formed with an annular concave groove intermediate said portions and defining a raceway, and the other of said members provided with an annular wall facing inwardly of said circular recess to provide a raceway, and balls positioned between said raceways, the different diameter portions of the first member providing for an underlap and an overlap for said balls, whereby the balls at all times roll on solid raceways.

2. The combination with a valve stem carried by a valve body and a valve seat within said body, of a valve carried by said stem and adapted to be raised from or lowered against said seat upon movement of said stem, said valve comprising a member provided with an annular wall defining a circular recess and formed with an annular concave groove in said annular wall facing inwardly of said circular recess; a second member within said circular recess and formed with a peripheral annular groove; and ball members positioned between said grooves of said two members for holding said members against displacement and permitting relative rotation therebetween, the said two members at the zone of the annular grooves having a line of separation at an angle to the common axis of rotation between said members.

3. In valve construction, a base member formed to carry a washer, said base member provided with a portion having two different diameters and provided with a peripheral annular groove interposed between said different diameter portions, balls for placement within said annular groove, a top adapted to in part surround the lesser diameter portion of the base member, and a cup between the said top and said base member and in part surrounding the portion of larger diameter of said base member and cooperating with the balls to secure the parts in working relationship.

4. In valve construction, a base member formed to carry a washer, said base member provided with a portion having two different diameters and provided with a peripheral annular groove interposed between said different diameter portions, balls for placement within said annular groove, a top adapted to in part surround the lesser diameter portion of the base member, and a cup between the said top and in part surrounding the portion of larger diameter of said base member; said cup formed with an inner concavity defining a race portion for said balls the said cup cooperating with said balls to interlock the base member with the top.

ROBERT S. FUNK.

REFERENCES CITED

The following references are of record in the file of this patent:

UNITED STATES PATENTS

| Number | Name | Date |
| --- | --- | --- |
| 1,069,282 | Oderman | Aug. 5, 1913 |
| 1,551,436 | Stacy | Aug. 25, 1925 |
| 1,707,073 | Black | Mar. 26, 1929 |
| 1,913,381 | Grass | June 13, 1933 |